Sept. 4, 1934.  H. RUFENER ET AL  1,972,240
PROCESS FOR OBTAINING DENSE CARBON DIOXIDE SNOW
DIRECTLY FROM LIQUID CARBON DIOXIDE
Original Filed Dec. 18, 1928
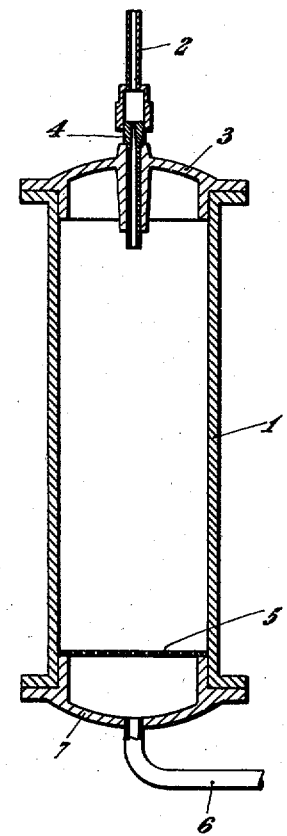
H. Rufener & T. Eichmann
INVENTOR
Marks & Clerk
Attys.

Patented Sept. 4, 1934

1,972,240

UNITED STATES PATENT OFFICE 1,972,240

PROCESS FOR OBTAINING DENSE CARBON DIOXIDE SNOW DIRECTLY FROM LIQUID CARBON DIOXIDE

Hans Rufener and Theophil Eichmann, Bern-Liebefeld, Switzerland, assignors to Georges B. Scarlett, Kennett Square, Pa., and James W. Brock, Newton, Mass.

Application December 18, 1928, Serial No. 326,899. Renewed June 29, 1934. In Switzerland June 26, 1928

4 Claims. (Cl. 62—121)

This invention relates to a process and apparatus for obtaining dense, specifically heavy carbon dioxide snow or ice directly from liquid carbon dioxide.

It is well known to make solid carbon dioxide, so-called carbon dioxide snow, by allowing liquid carbon dioxide to expand to atmospheric pressure, collecting the snow by filtration, and supplying the vapors that are formed to the low-pressure cylinder of the compressor to be liquefied again. Normally the escaping gases are simultaneously employed for pre-cooling the liquid to be expanded. The loose snow is made by high pressure very dense, $\gamma$=about 1, there being about 10% sublimated and reckoned as lost. In other words the dry and therefore looser snow which has previously been obtained from liquid carbon dioxide is condensed mechanically by compression, about 10% of the snow being converted into gas and lost to the yield.

In contradistinction to this known method the present invention enables exceedingly dense carbon dioxide snow or ice to be made in a simple physical manner in one single operation.

According to the present invention, the liquid carbon dioxide is expanded to a pressure below the triple point of carbon dioxide, and the vapor or gas, so-called throttle vapors, produced thereby are compelled to diffuse through the solid snow thus produced in order to compress it into a product of higher density.

The invention also provides apparatus comprising an expansion vessel into which the liquid carbon dioxide is admitted by means of an expansion nozzle, wherein a filter is provided for collecting the snow produced, and a pipe for drawing off the gas through the filter and through the mass of snow therein is connected to the vessel at a situation behind the filter with relation to the direction of flow of the carbon dioxide through the vessel.

One form of apparatus suitable for carrying into practice the improved process is diagrammatically illustrated by way of example in vertical sectional elevation in the accompanying drawing.

Referring to the drawing, the apparatus comprises a vertical expansion vessel 1 for liquid carbon dioxide which is supplied by a pipe 2 to an expansion nozzle 4 mounted in the top cover plate 3. The nozzle 4 opens into the interior of the expansion vessel 1, in which the carbon dioxide is expanded to a pressure below that corresponding to the triple point of carbon dioxide. The snow thus formed is thrown on to a filter 5.

The greater the height of the resulting block of snow, the greater becomes the resistance to the gas or throttle vapors diffusing through the snow. In this way the several flakes of snow are pressed tightly one on another and a high density is thereby obtained. The gases diffusing through the mass of snow are led away from below the filter 5 through a pipe 6 to a compressor. When a snow block of the desired height is obtained the bottom cover plate 7 of the vessel, through which the pipe 6 opens, is removed. The block of snow of the usual commercial shape can then be removed below from the expansion vessel having a form corresponding in cross-section to that shape. After closing the said vessel the described operation can be repeated.

By means of the described process a compact mass of great specific weight is produced in one operation and without the aid of a press.

Various modifications may be made in the details of construction described above within the scope of the invention as defined in the claims.

We claim:

1. A process of producing dense, specifically heavy carbon dioxide snow from liquid carbon dioxide, including the steps of; expanding liquid carbon dioxide to a pressure below the triple point to produce dry carbon dioxide snow and gases, and simultaneously with and during the liquid expansion and snow formation, compelling the gases to diffuse downwardly through the dry snow to compress and compact the snow into a mass of higher density.

2. A process of producing dense, specifically heavy carbon dioxide snow from liquid carbon dioxide, including the steps of expanding the liquid carbon dioxide into an expansion chamber with the resulting formation of carbon dioxide snow and gases, permitting the snow to settle and collect at the lower end of the chamber, and simultaneously with the liquid expansion and snow formation compelling gas to diffuse downwardly through the collected snow to compress and compact the same into a snow mass of higher density.

3. A process of producing a dense, specifically heavy carbon dioxide snow mass from liquid carbon dioxide, including the steps of expanding liquid carbon dioxide in an expansion chamber with the resulting formation of carbon dioxide snow and gases in the chamber, permitting the snow so formed to collect on a filter at the lower end portion of the chamber, and during the formation and collection of the snow drawing off gases from the chamber downwardly through the snow on the filter, to compress and compact the snow into a snow mass of higher density.

4. A process for producing a relatively dense, specifically heavy mass of carbon dioxide snow, including the steps of: expanding liquid carbon dioxide to a pressure at which carbon dioxide snow and gases are produced, continuing such snow production while collecting the snow so formed, and during formation and collection of the snow diffusing gases downwardly therethrough to compress and compact the snow into a carbon dioxide snow mass of relatively higher density.

HANS RUFENER.
THEOPHIL EICHMANN.

CERTIFICATE OF CORRECTION.

Patent No. 1,972,240.      September 4, 1934.

HANS RUFENER, ET AL.

It is hereby certified that the above numbered patent was erroneously issued to "Georges B. Scarlett, of Kennett Square, Pennsylvania, and James W. Brock, of Newton, Massachusetts, as assignees," whereas said patent should have been issued to International Carbonic Engineering Company, Kennett Square, Pennsylvania, a corporation of Delaware,, as assignee by mesne assignments of the entire interest in said invention as shown by the records of assignments in this office; and that the said Letters Patent should be read with this correction therein that the same may conform to the record of the case in the Patent Office.

Signed and sealed this 2nd day of October, A. D. 1934.

(Seal)

Leslie Frazer
Acting Commissioner of Patents.

on the filter, to compress and compact the snow into a snow mass of higher density.

4. A process for producing a relatively dense, specifically heavy mass of carbon dioxide snow, including the steps of: expanding liquid carbon dioxide to a pressure at which carbon dioxide snow and gases are produced, continuing such snow production while collecting the snow so formed, and during formation and collection of the snow diffusing gases downwardly therethrough to compress and compact the snow into a carbon dioxide snow mass of relatively higher density.

HANS RUFENER.
THEOPHIL EICHMANN.

CERTIFICATE OF CORRECTION.

Patent No. 1,972,240.   September 4, 1934.

HANS RUFENER, ET AL.

It is hereby certified that the above numbered patent was erroneously issued to "Georges B. Scarlett, of Kennett Square, Pennsylvania, and James W. Brock, of Newton, Massachusetts, as assignees," whereas said patent should have been issued to International Carbonic Engineering Company, Kennett Square, Pennsylvania, a corporation of Delaware,, as assignee by mesne assignments of the entire interest in said invention as shown by the records of assignments in this office; and that the said Letters Patent should be read with this correction therein that the same may conform to the record of the case in the Patent Office.

Signed and sealed this 2nd day of October, A. D. 1934.

(Seal)

Leslie Frazer
Acting Commissioner of Patents.